(12) United States Patent
Laursen

(10) Patent No.: US 7,757,349 B2
(45) Date of Patent: Jul. 20, 2010

(54) RACK MOUNTED COMPONENT DOOR SYSTEM AND METHOD

(75) Inventor: Erik Laursen, Kirkland, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 12/421,386

(22) Filed: Apr. 9, 2009

(65) Prior Publication Data

US 2009/0223022 A1 Sep. 10, 2009

Related U.S. Application Data

(63) Continuation of application No. 11/337,178, filed on Jan. 20, 2006, now Pat. No. 7,536,752.

(60) Provisional application No. 60/646,322, filed on Jan. 21, 2005.

(51) Int. Cl.
*E05D 11/06* (2006.01)
(52) U.S. Cl. .................. 16/358; 6/359; 6/360
(58) Field of Classification Search .......... 16/358, 16/359, 360; 211/26, 168, 169, 189; 296/26.1–26.15; 312/223.1, 265.1–265.4, 325, 327, 238; 405/99–101
See application file for complete search history.

(56) References Cited

U.S. PATENT DOCUMENTS

| 1,412,039 | A |   | 4/1922  | Bowman |
|-----------|---|---|---------|--------|
| 2,210,762 | A |   | 8/1940  | Itzigson |
| 2,584,173 | A |   | 12/1947 | Fowler |
| 2,793,387 | A |   | 5/1957  | Odell  |
| 2,867,839 | A | * | 1/1959  | Squire ......................... 16/358 |
| 4,843,680 | A |   | 7/1989  | Cress et al. |
| 5,169,221 | A |   | 12/1992 | Wheeler |
| 5,186,335 | A |   | 2/1993  | Fahey et al. |
| 5,553,724 | A |   | 9/1996  | Moher et al. |
| 5,632,388 | A |   | 5/1997  | Morrison et al. |
| 5,816,419 | A |   | 10/1998 | Lamson |
| 5,877,938 | A |   | 3/1999  | Hobbs et al. |
| 6,119,879 | A |   | 9/2000  | Acchione |
| 6,158,600 | A |   | 12/2000 | Ferrucci et al. |
| 6,167,977 | B1 |  | 1/2001  | Adamson et al. |
| 6,201,690 | B1 |  | 3/2001  | Moore et al. |
| 6,318,567 | B1 |  | 11/2001 | Braley |
| 6,353,532 | B1 |  | 3/2002  | Landrum et al. |
| 6,452,788 | B1 |  | 9/2002  | Crowley |
| 6,538,879 | B2 |  | 3/2003  | Jiang |
| 6,793,893 | B2 |  | 9/2004  | Kleinsasser |
| 6,961,246 | B2 |  | 11/2005 | Dickey et al. |
| 2002/0153814 | A1 | | 10/2002 | Robideau |
| 2003/0020379 | A1 | | 1/2003  | Larsen et al. |

\* cited by examiner

*Primary Examiner*—Victor Batson
*Assistant Examiner*—Roberta Delisle
(74) *Attorney, Agent, or Firm*—Davis Wright Tremaine LLP; George C. Rondeau, Jr.; Heather M. Colburn

(57) ABSTRACT

A rack mounted component door system according to the present invention is used in conjunction with a conventional equipment rack to secure components in the rack and to provide access to features of the components positioned away from the front side of the rack. The component door system includes two hinge assemblies that can be attached directly to two opposing vertical members of the front side of a conventional rack. The component door system also includes a panel that can be of conventional configuration or tailored for the component door system. The panel is attached to the two hinge assemblies to extend between the two front side vertical members of the rack.

8 Claims, 11 Drawing Sheets with connection of the panel 104 to the component door system 100.

RACK MOUNTED COMPONENT DOOR SYSTEM AND METHOD

CROSS REFERENCE TO RELATED APPLICATION

This application claims priority benefit of U.S. patent application Ser. No. 11/337,178 filed Jan. 20, 2006 and of provisional application Ser. No. 60/646,322 filed Jan. 21, 2005.

BACKGROUND OF THE INVENTION

1. Field of the Invention

The present invention relates generally to the field of equipment racks, and more particularly to the field of component support provided by such racks.

2. Description of the Related Art

Racks, frames, cabinets and the like (referred to generally herein as "racks") support computer and other electronic equipment and doors and panels (referred to generally herein as "components"). The racks and the components are mutually sized to accommodate placement of the components within the racks. Racks can include vertical members generally spaced a selected standardized distance from one another and cross-members extending between the vertical members. Both the vertical members and the cross-members can have attachment points where the components are secured. These attachment points can include holes to receive bolts, which may be used along with nuts for securing the components.

The racks are typically positioned so that a side of the rack (referred to generally herein as the "backside") is either against a wall of a room or against the backside of another rack. The side of a subject rack (referred to generally herein as the "front side") opposite its backside can provide access to the components supported by the rack since the front side of the rack generally faces outward into a room away from a wall or another rack that is adjacent to the subject rack. The components can include patch panels extending between the vertical members along the front side of the racks. These patch panels can have slots and other openings for mounting of patch blocks supporting multiple connectors and other items for access from the front side of the racks. The panels are generally securely fastened to the vertical members, and the patch blocks or individual connectors or other devices are securely fastened to the panels Unfortunately, the components can have features that cannot be accessed from the front side of the rack. These features may be accessed from the backside of the racks, which is troublesome unless the backside of the racks are easily accessible. However, if the racks are positioned so that their backsides are against a wall or against a backside of another rack, access to these components features can be problematic.

BRIEF DESCRIPTION OF THE SEVERAL VIEWS OF THE DRAWING(S)

DETAILED DESCRIPTION OF THE INVENTION

A component door system according to the present invention is used in conjunction with a conventional component rack to secure components in the rack and to provide access to features of the components positioned away from the front side of the rack. The component door system includes two hinge assemblies that can be attached directly to two opposing vertical members of the front side of a conventional rack. The component door system includes a panel that can be of conventional configuration or tailored for the component door system. The panel is attached to the two hinge assemblies to extend between the two front side vertical members of the rack.

Figure 1:
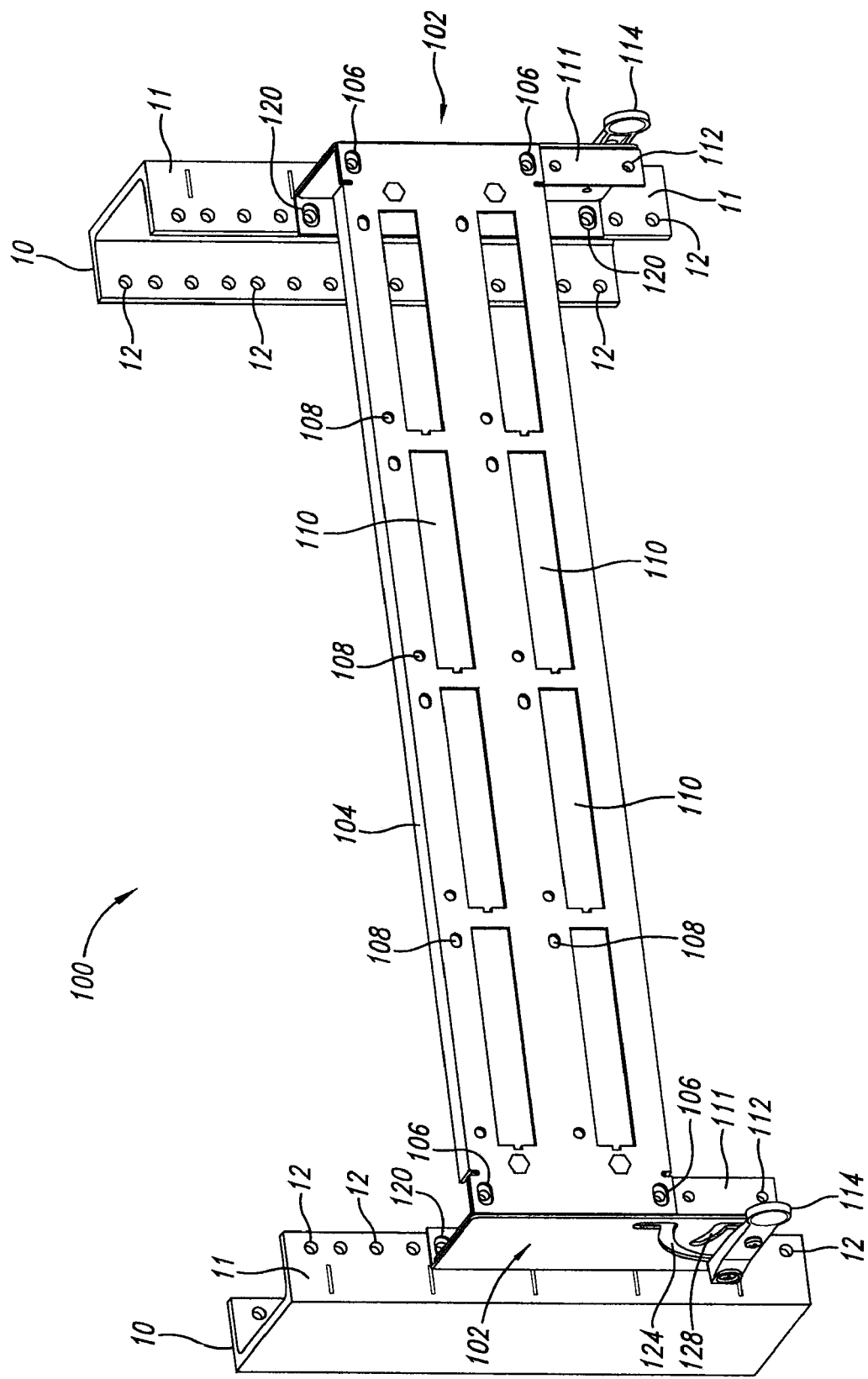
FIG. 1 is an isometric diagram illustrating an implementation of a component door according to the present invention in a closed position shown attached to portions of a conventional rack.

Opposing conventional vertical racks members 10 having a front side 11 with bolt holes for receiving attachment of conventional components (not shown) and associated panels (not shown) are shown in FIG. 1 as having an implementation of a component door system 100 according to the present invention attached thereto.

The component door system 100 includes two hinge assemblies 102, each attached to opposing vertical rack members 10 with a panel 104 attached to and extend between the two hinge assemblies. The panel 104 can be of conventional design or can be configured particularly for the component door system 100. As shown, the panel 104 includes holes 106 for use with bolt-nut assemblies 107 (shown in FIG. 2) to attach the panel to the hinge assemblies 102. The panel 104 further includes holes 108 to receive bolt-nut assemblies (not shown) for attaching face plates (not shown) to the panel and includes elongated access ports 110 to receive patch blocks, connectors or other devices (not shown) into the panel.

The two hinge assemblies 102 each include front sides 111 with holes 112 to receive the bolt-nut assemblies 107 to affix the panel 104 to the hinge assemblies. A lever arm 114 is included with each of the hinge assemblies 102 to open (shown in FIG. 2 in a midway open position and in FIG. 3 is a fully open position) the hinge assemblies and the attached panel 104 to provide access to the component (not shown) affixed to the panel and to subsequently close (shown in FIG. 1 in a closed position) and secure the hinge assemblies and the panel to restrict access to the attached component.

Figure 2:
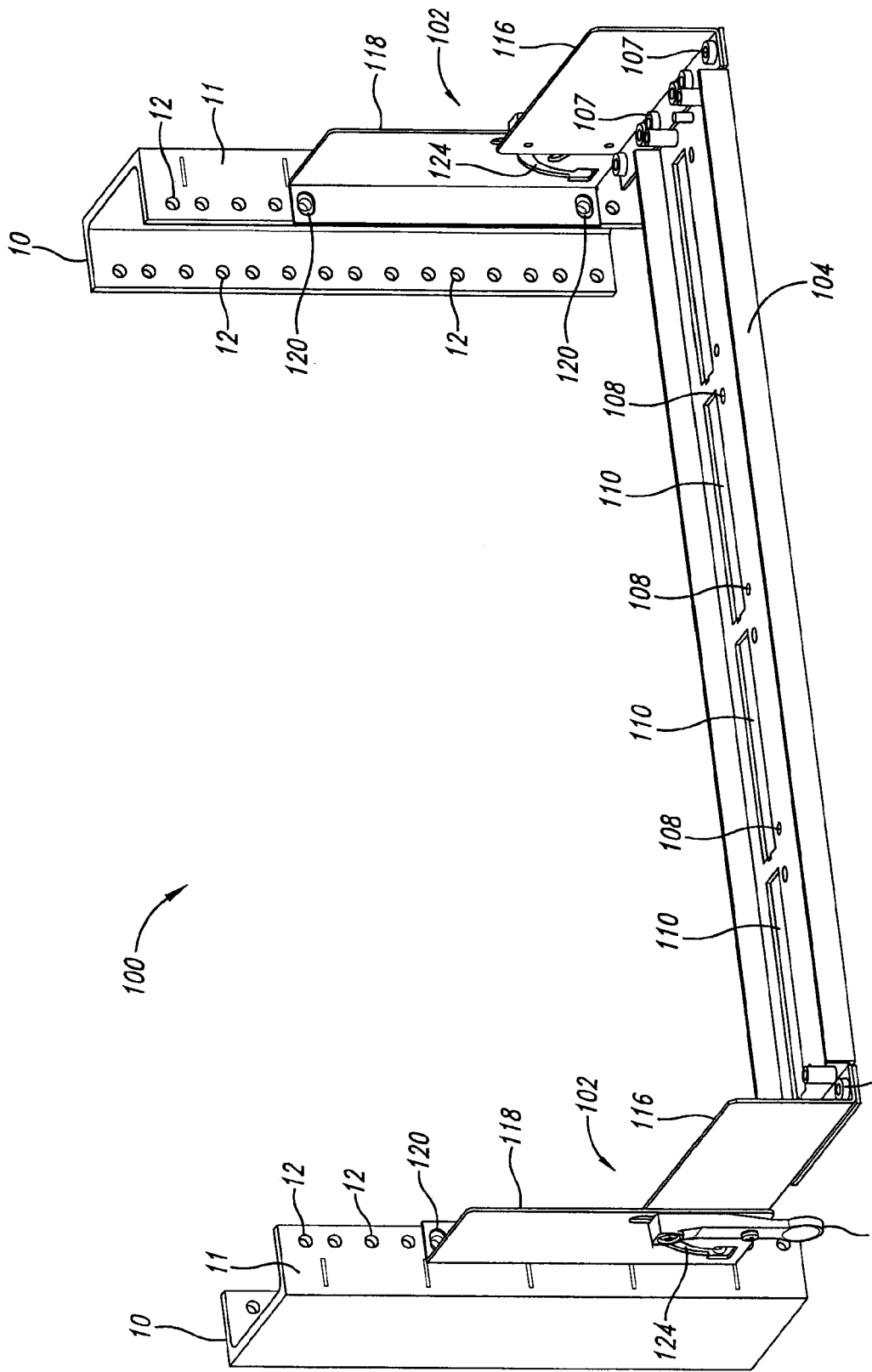
FIG. 2 is an isometric diagram of the component door of FIG. 1 in a midway open position.
Figure 3:
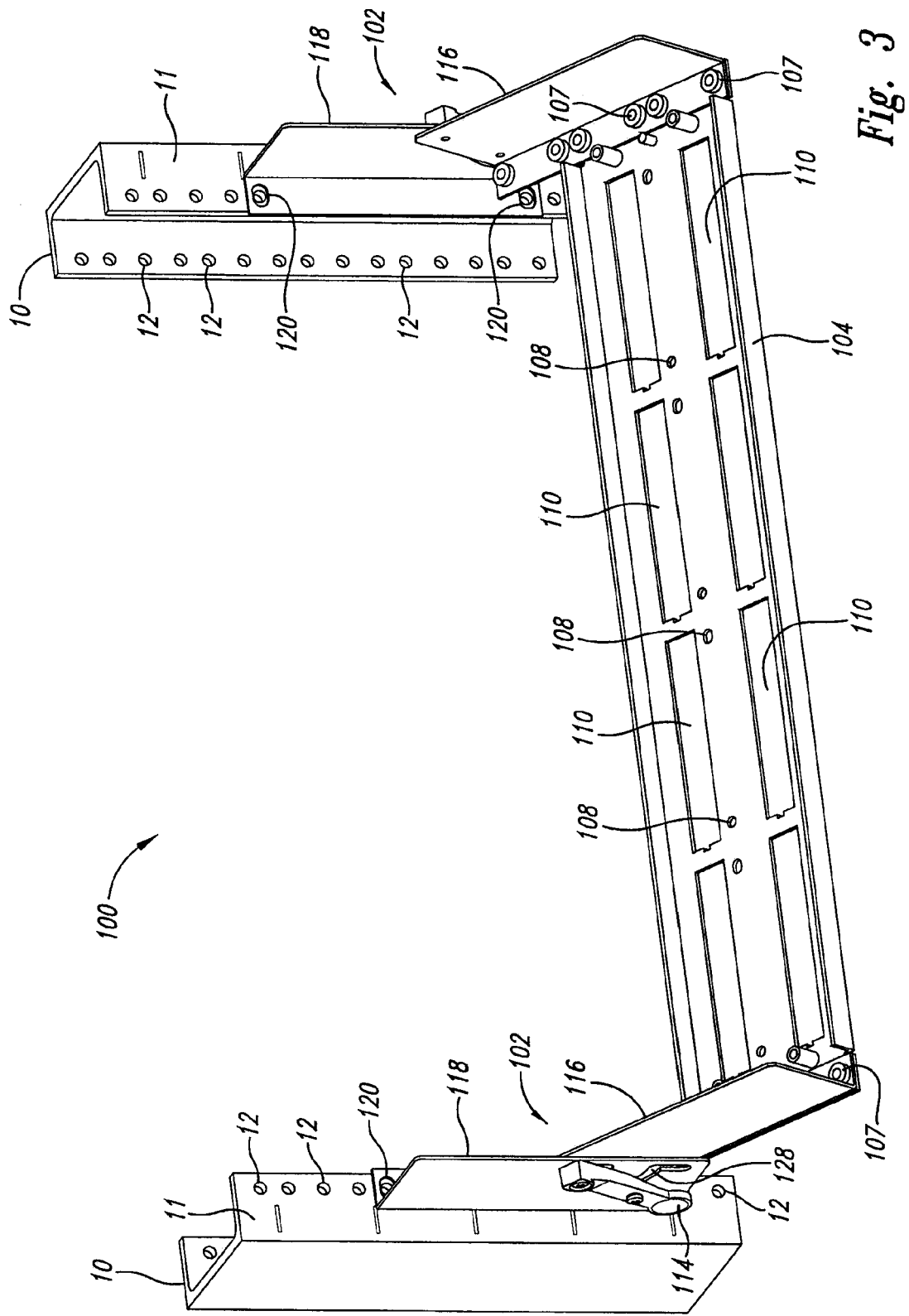
FIG. 3 is an isometric diagram of the component door of FIG. 1 in a fully open position.

The hinge assemblies 102 each include a mobile member 116 and a stationary member 118 as shown in FIG. 2. The mobile member 116 is attached to the lever arm 114 for movement therewith. The stationary member 118 is attached to the front side 11 of the vertical rack member 10 by bolt-nut assemblies (not shown) placed through mounting holes 120 in the stationary member. The stationary member 118 is positioned between the mobile member 116 and the lever arm 114 with the mobile member 116 movably coupled thereto so that the mobile member can move relative to the rack 10 providing the panel 104 with a hinge action relative to the rack. Movable coupling occurs between the mobile member 116 and the stationary member 118 because the lever arm 114 is fixedly attached to the mobile member by a first traveller assembly 122, which passes through a first slotted track 124 in the stationary member, and is fixedly attached by a second traveller assembly 126, which passes through a second slotted track 128 in the stationary member, as shown in FIG. 4.

Figure 4:
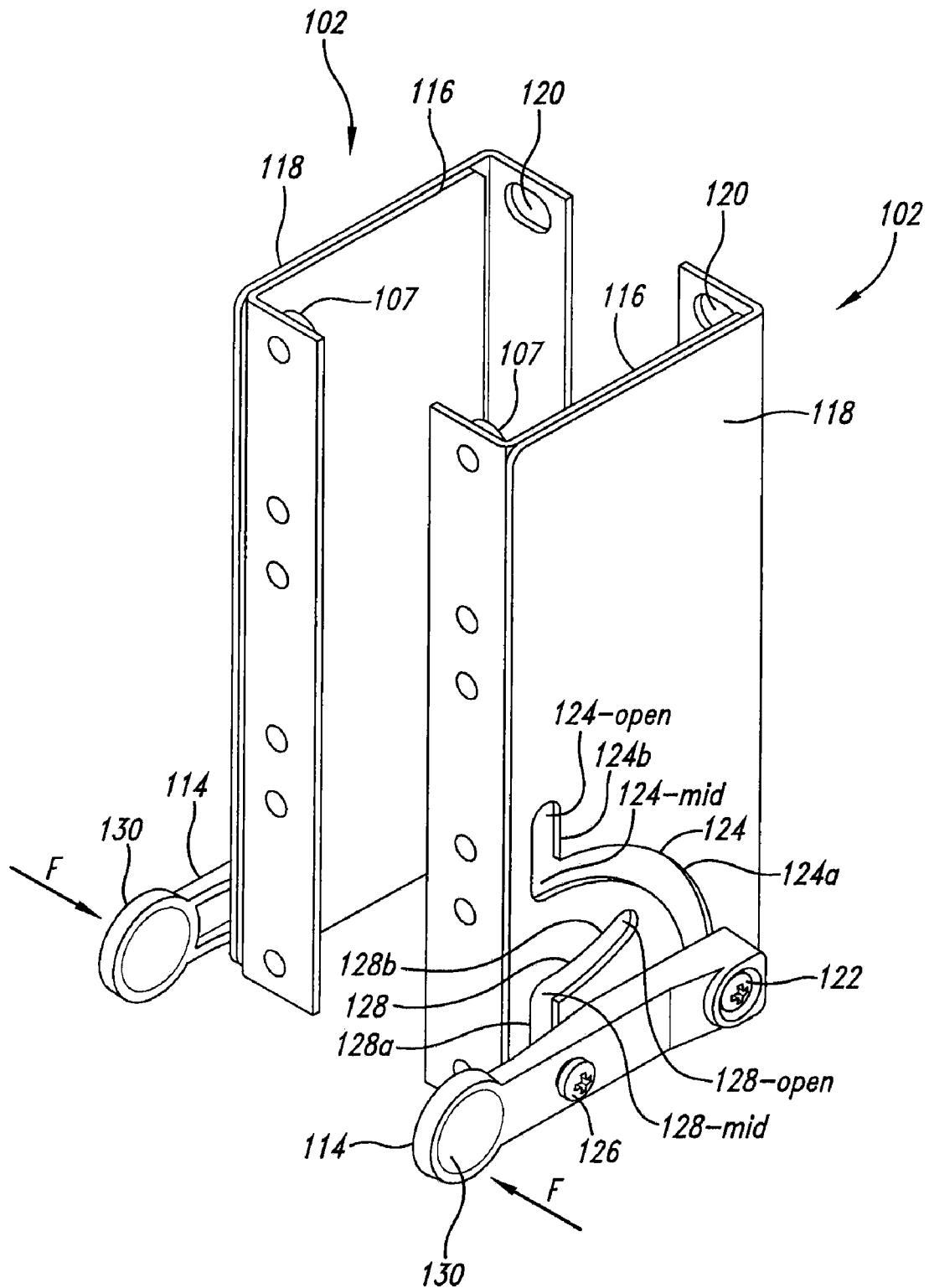
FIG. 4 is an enlarged, isometric view of the hinge assembly of the component door of FIG. 1 shown in the closed position.

In operation, a force, F, is applied to a tab end 130 of each of the lever arms 114, as shown in FIG. 4. The second traveller assembly 126 acts as a fulcrum such that when the force, F, is applied, the first traveller assembly 122 moves in a direction opposite to the force, F, which consequently, unlocks the lever arm 114 as further described below. The first track 124 has a first portion 124a, which is substantially curved, and an upwardly extending second portion 124b, which is substantially straight. The second track 128 has an upwardly extending first portion 128a, which is substantially straight, and a second portion 128b, which is substantially curved.

Figure 5:
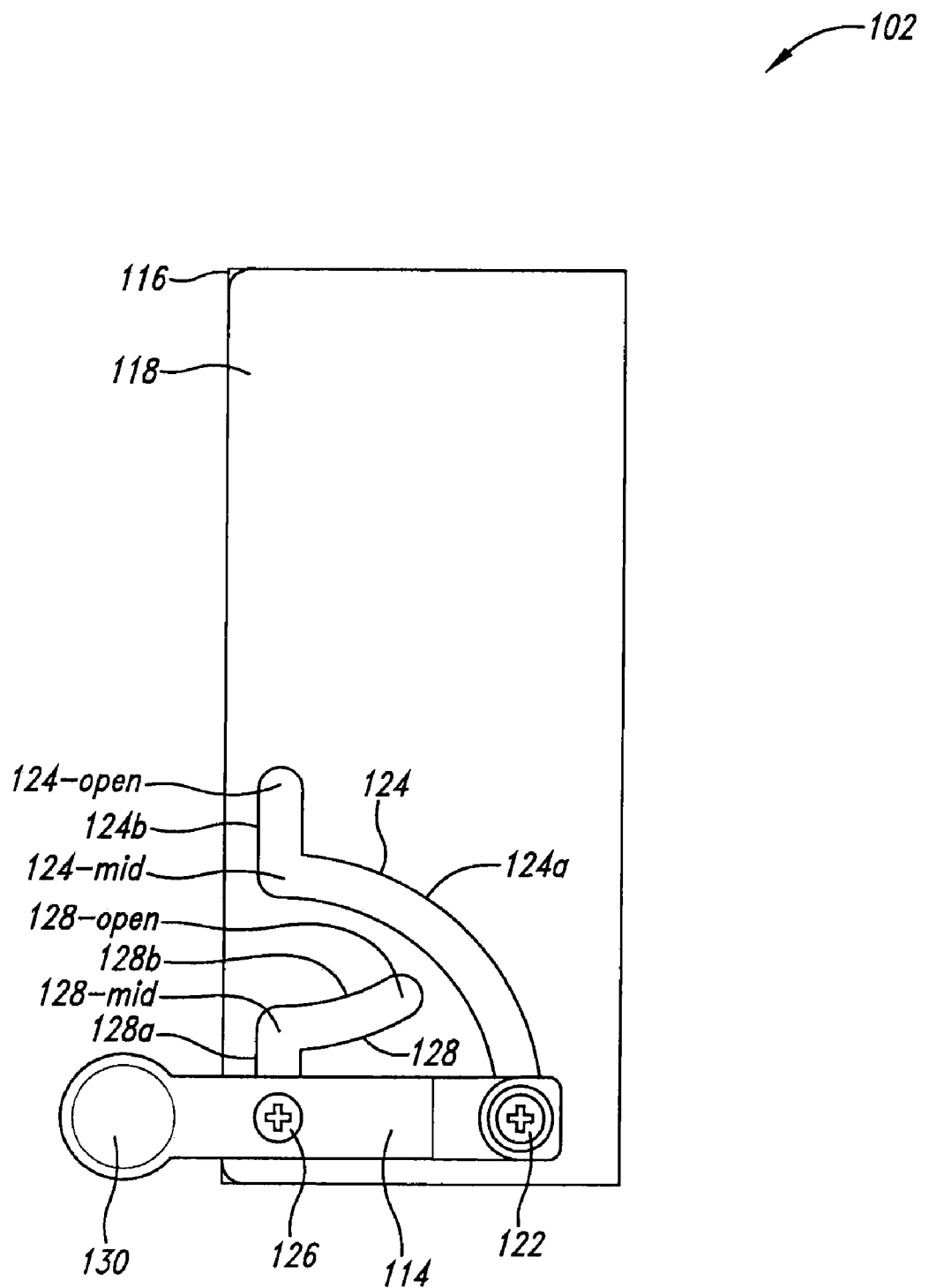
FIG. 5 is a side elevational view of the hinge assembly of FIG. 4 shown in the closed position.
Figure 6:
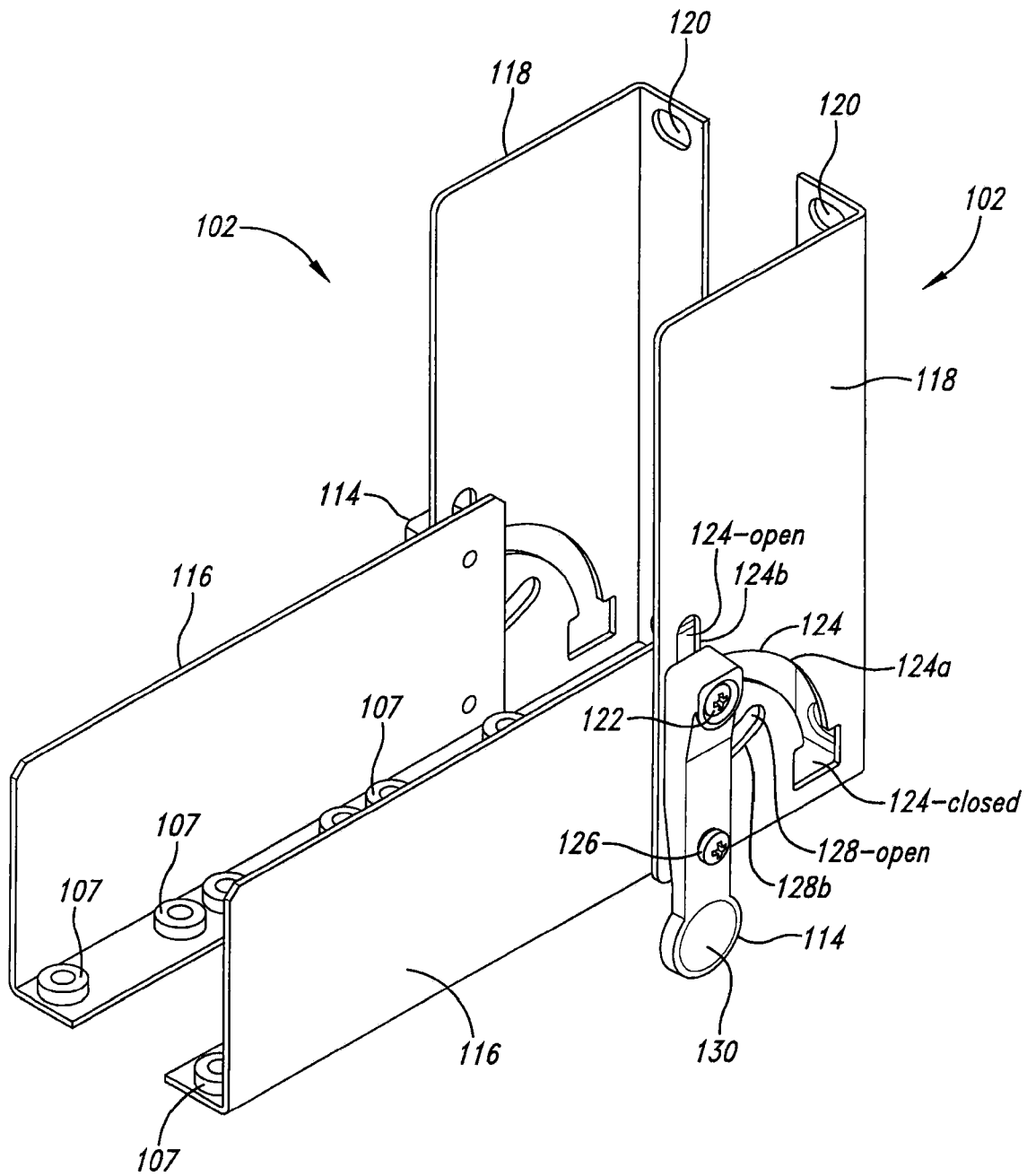
FIG. 6 is an isometric view of the hinge assembly of FIG. 4 shown in the midway open position.
Figure 7:
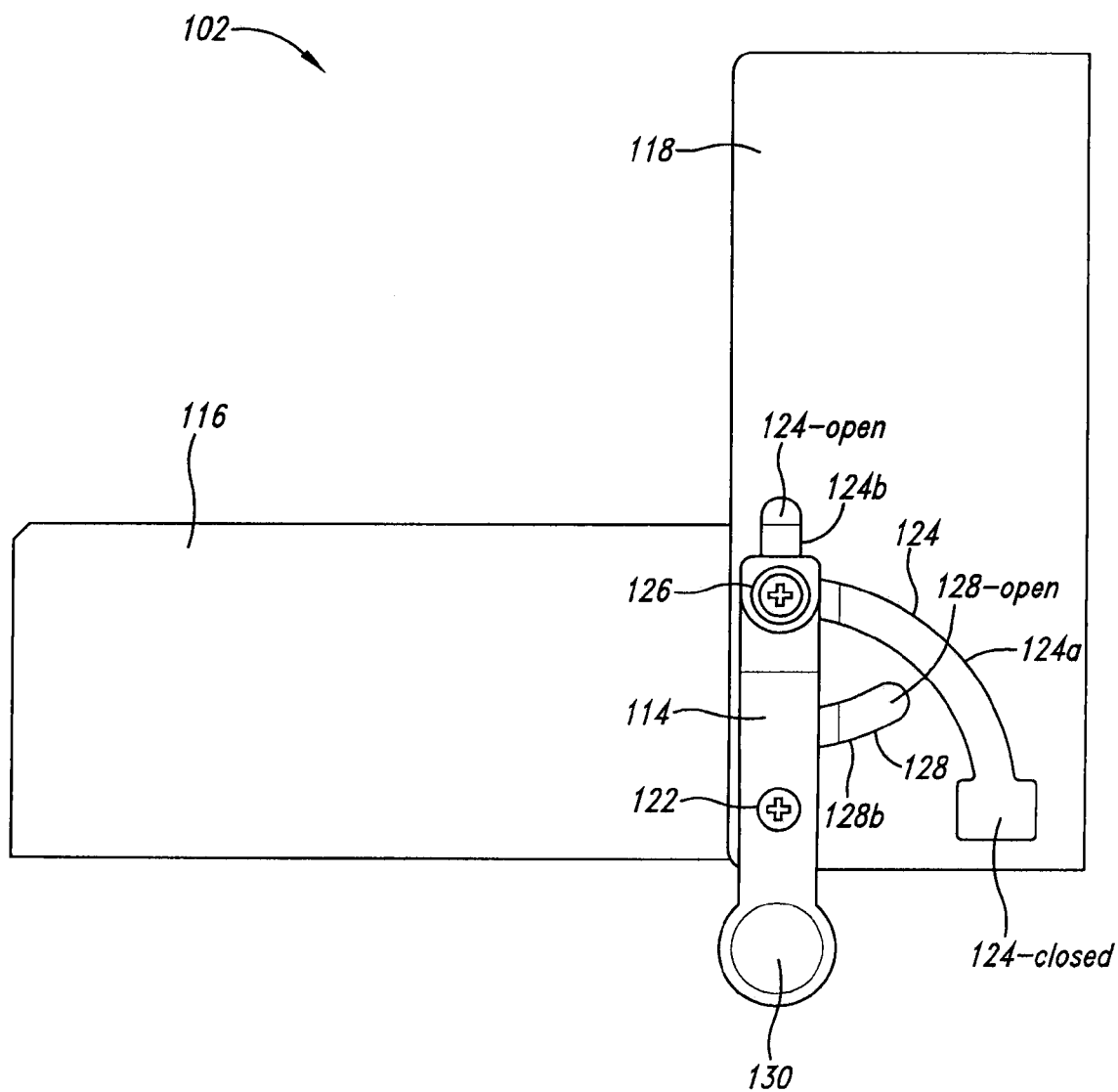
FIG. 7 is a side elevational view of the hinge assembly of FIG. 4 shown in the midway open position.

For the component door system 100 to go from the closed position depicted in FIGS. 1, 4, and 5 to the midway open position depicted in FIGS. 2, 6, and 7, the first screw assembly 122 follows the first portion 124a of the first track 124 from the closed position 124—closed of the first track (identified as 124—closed in FIG. 6) to a midway position 124—mid between the first portion and the second portion 124b of the first track. During this travel of the first screw assembly 122, the second screw assembly 126 remains substantially in a closed position 128—closed of the second track 128 (identified as 128—closed in FIG. 8) so that the first screw assembly 122 partially rotates (following the first portion 124a of the first track 124) about the closed position 128—closed of the second track whereat the second screw assembly 126 is positioned.

Figure 8:
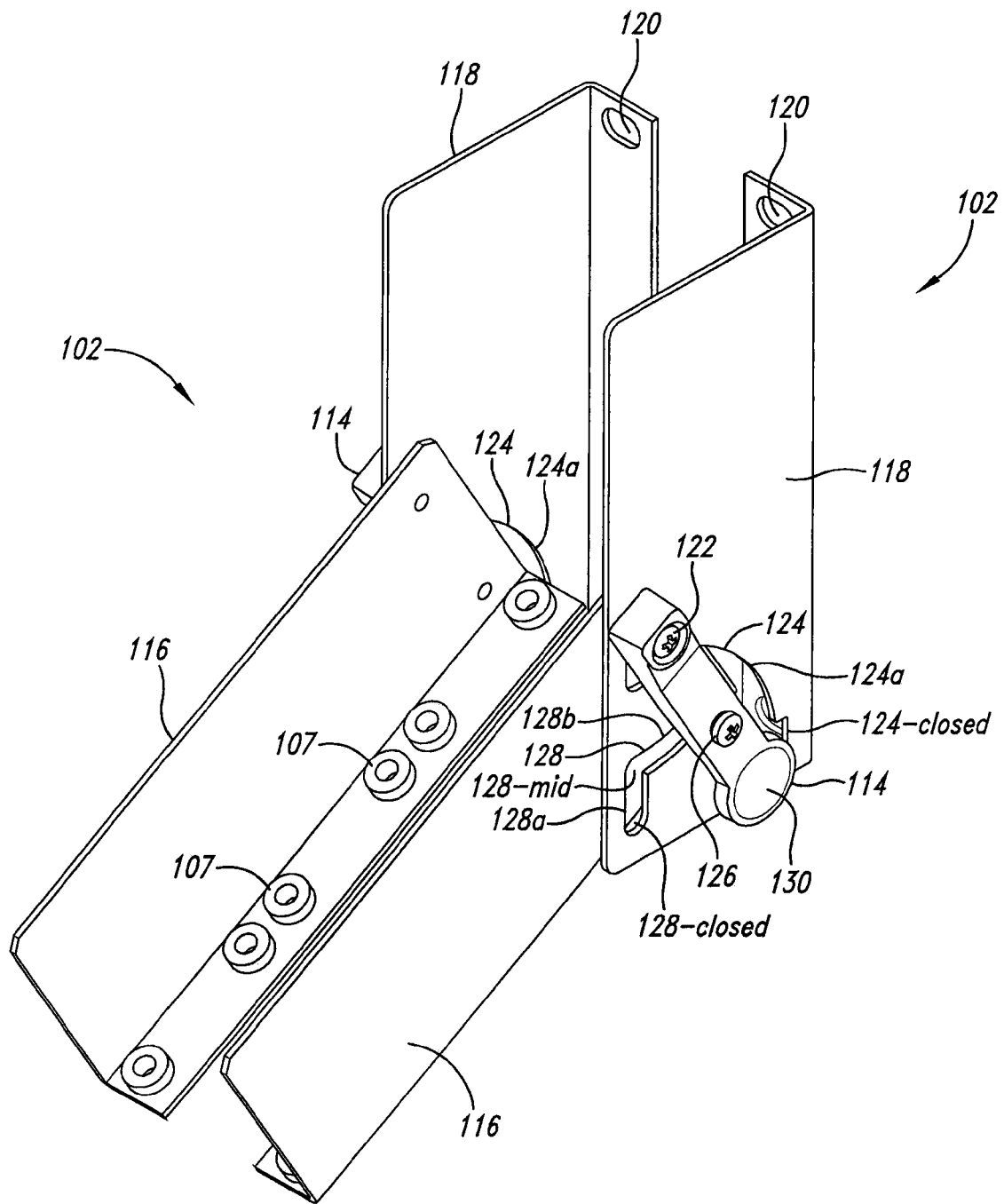
FIG. 8 is an isometric view of the hinge assembly of FIG. 4 shown in the fully open position.
Figure 9:
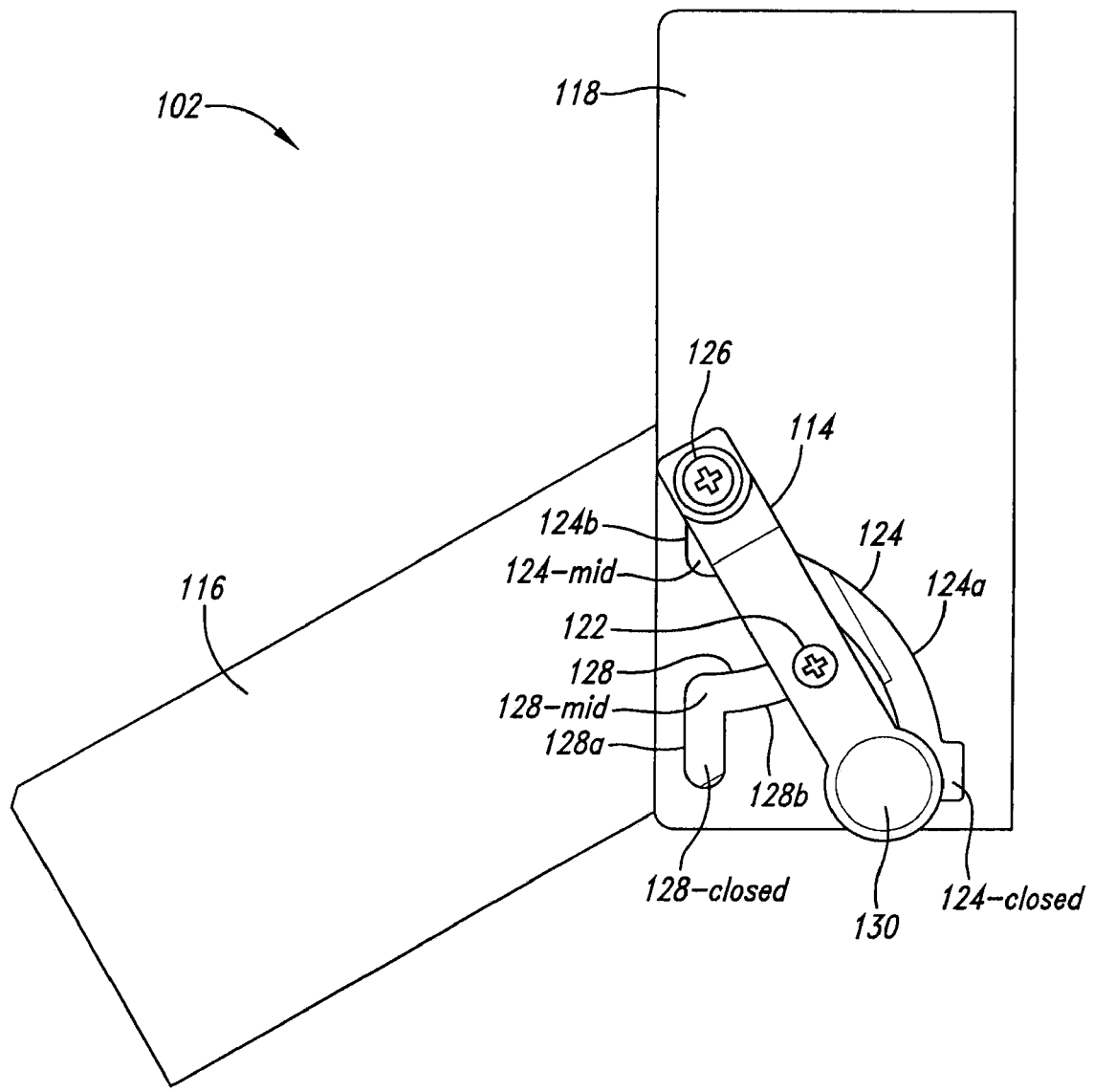
FIG. 9 is a side elevational view of the hinge assembly of FIG. 4 shown in the fully open position.

For the component door system 100 to go from the midway open position depicted in FIGS. 2, 6, and 7 to the fully open position depicted in FIGS. 3, 8, and 9, the first screw assembly 122 and the second screw assembly 126 move together during a first stage of movement. During this concurrent movement, the first screw assembly 122 follows the second portion 124b of the first track 124 from the midway position 124—mid to an open position 124—open of the first track. Also during this concurrent movement, the second screw assembly 126 moves from the closed position 128—closed to a mid-position 128—mid of the second track 128. A second stage of movement is then undertaken in which the first screw assembly 122 remains stationary at the open position 124—open of the first track 124. During this second stage of movement, the second screw assembly 126 moves from the mid-position 128—mid of the second track 128 to an open position 128—open by following the second portion 128b of the second track. While the second screw assembly 126 moves along the second portion 128b of the second track 128, the first traveller assembly 122 remains substantially in the open position 124—open of the first track 124 so that the second screw assembly 126 partially rotates about the open position 124—open of the first track whereat the first screw assembly 122 is positioned.

The curved first portion 124a of the first track 124 extends along a substantially circular arc with a center at the closed position 128—closed of the second track 128; and the curved second portion 128b of the second track 128 extends along a substantially circular arc with a center at the open position 124—open of the first track 124.

Figure 10:
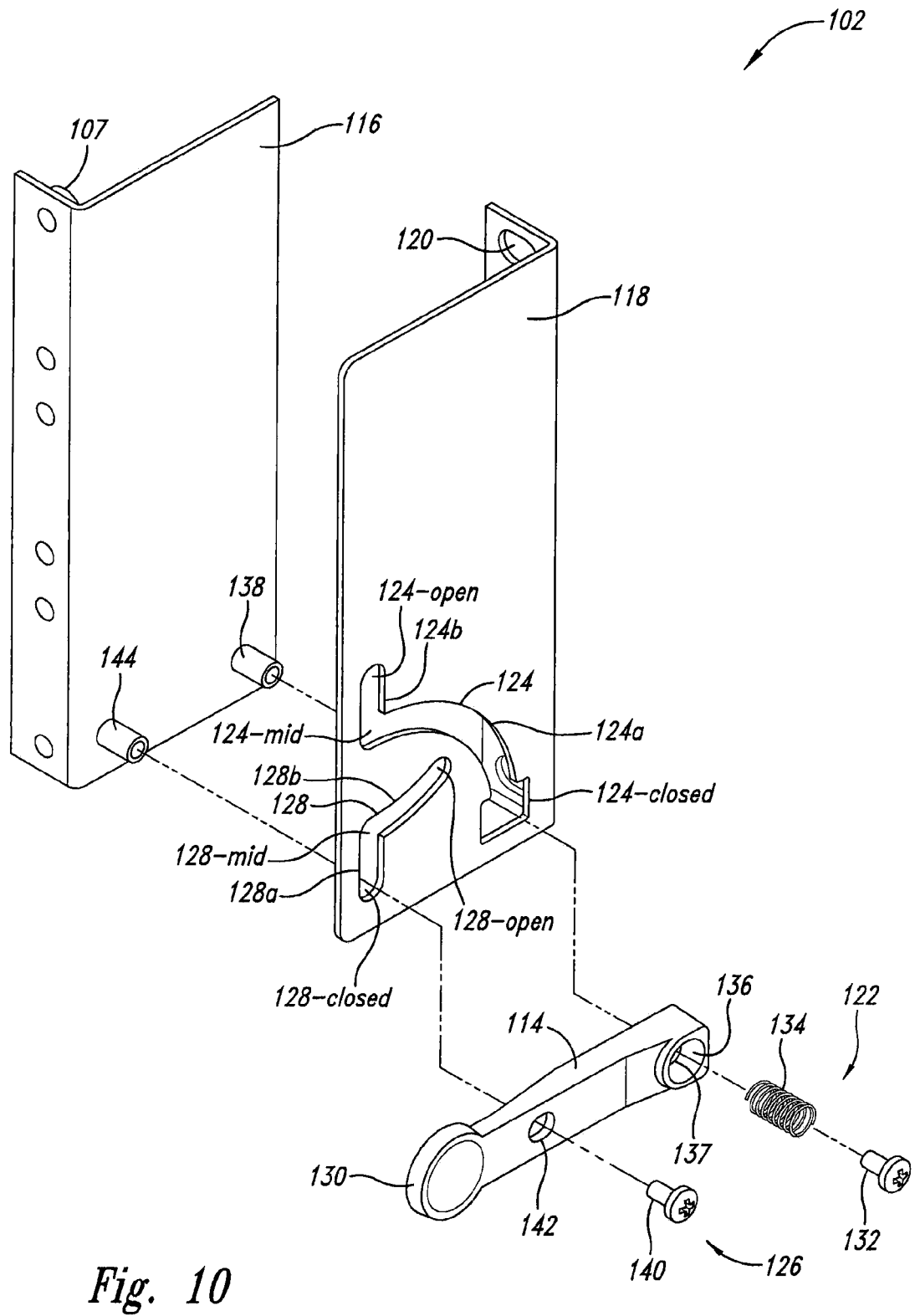
FIG. 10 is a first exploded isometric view of the hinge assembly of FIG. 4.
Figure 11:
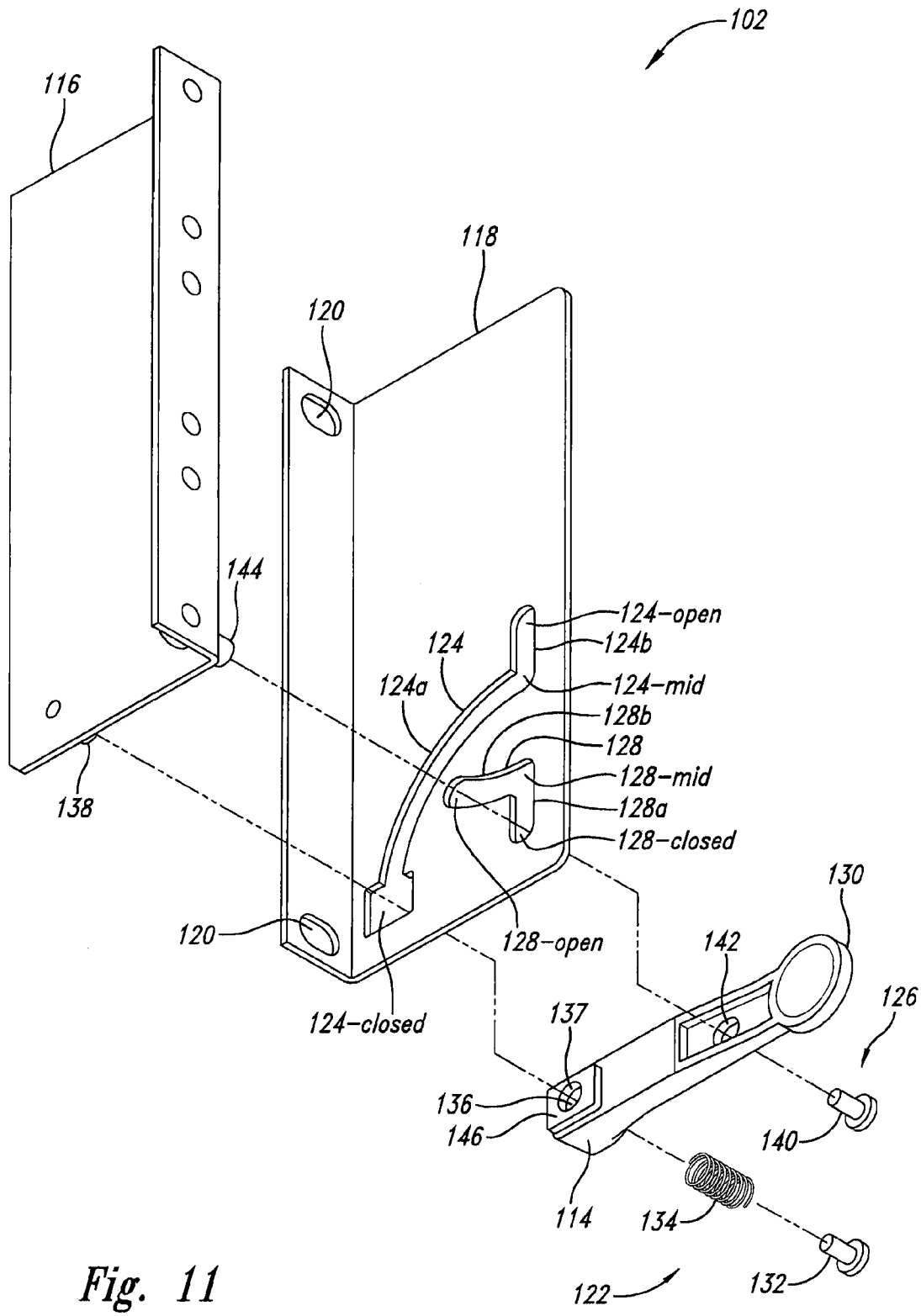
FIG. 11 is a second exploded isometric view of the hinge assembly of FIG. 4.

In the depicted implementation, as illustrated in FIGS. 10 and 11, the first traveler assembly 122 includes a screw 132 and a spring 134 that receives the screw. The lever arm 114 includes a recess 136 sized to received and retain the spring 134 and head of the screw 132 which retains the spring in the recess. The screw-132 passes through the spring 134 and extends out a hole 137 in the base of the recess 136. The mobile member 116 includes a threaded stem 138 that threadably receives the screw 132 so that the first traveler assembly 122 attaches the end portion of the lever arm 114 opposite the tab end 130 to the mobile member 116. In the depicted embodiment, the second screw assembly 126 includes a screw 140 that is inserted through a hole 142 in the lever arm 114, at a location between the screw 132 and the tab end 130 of the lever arm, and is received by a threaded stem 144 on the mobile member 116 to attach the mid-portion of the lever arm to the mobile member.

The lever arm 114 further includes a laterally inward projecting lock portion 146 sized and shaped to fit into the first track 124 at the closed position 124—closed. In the implementation depicted in FIG. 11, the lock portion 146 is square sized and larger than the first track 124 except for the portion at the closed position 124—closed of the first track. The spring 134 biases the lock portion 146 laterally inward into the corresponding square sized portion of the first track 124 at the closed position 124—closed. When the force, F, is applied to the tab end 130, with the lock portion 146 at the closed position 124—closed of the first track 124, sufficient to overcome the force of the spring 134 that tends to keep the lock portion in the square sized portion of the first track, the lock portion is lifted out of the square portion of the first track and the screw 132 is free to be moved along the first track 124 as a traveller guided by the first track of the first traveller assembly 122. When the first traveller assembly 122 is moved along the first track 124 away from the closed position 124—closed, the lock portion 146 is large enough relative to the remainder of the first track that it must ride on top of the first track 124 rather than in the first track. Only when the first traveller assembly 122 returns to the closed position 124—closed will the lock portion 146, under the urging of the spring 134 or manual force applied to the lever 114, return to being in the square portion of the first track to lock the component door system 100 in its closed position.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

The invention claimed is:

1. For a component rack having opposing first and second vertical members, a system comprising:
   a panel sized to extend between the vertical members;
   a stationary member couple-able to the first vertical member;
   a mobile member coupled to the panel;

a first opening in the stationary member shaped to form a first track including a first position, a second position, and a third position;

a second opening in the stationary member shaped to form a second track including a first position, a second position, and a third position;

a lever member coupled to the mobile member through a first attachment member and through a second attachment member, the first attachment member passing through the first opening, the second attachment member passing through the second opening;

wherein the first track and the second track are shaped so that while the first attachment member is at the first position of the first track, the second attachment member can move from the first position to the second position of the second track thereby traveling substantially in an arc about the first attachment member; and wherein the first track and the second track are shaped so that while the second attachment member is moving from the first position to the second position of the second track, the first attachment member is held in the first position of the first track by the first track and the lever member.

2. The system of claim 1 wherein the first track and the second track are shaped so that while the second attachment member is at the third position of the second track, the first attachment member can move from the second position to the third position of the first track thereby traveling substantially in an arc about the second attachment member; and wherein the first track and the second track are shaped so that while the first attachment member is moving from the second position to the third position of the first track, the second attachment member is held in the third position of the second track by the second track and the lever member.

3. The system of claim 1 wherein the first track having a first portion with a first width and a second portion with a second width, the first width being greater than the second width; and wherein the lever member having a peg portion extending from another portion of the level member, the peg portion having a width greater than the second width of the first track and smaller than the first width of the first track, the lever being positioned so that the peg portion of the lever member is inserted into the first portion of the first track when the first attachment member is at a first position of the first track and the peg portion is adjacent to, but not in, the second portion of the first track when the first attachment member is at a second position of the first track.

4. A hinge to mount a panel on a component rack having opposing first and second vertical members, the hinge comprising:

a stationary member couple-able to the first vertical member;

a mobile member coupled to the panel;

a first opening in the stationary member shaped to form a first track including a first position, a second position, and a third position;

a second opening the stationary member shaped to form a second track including a first position, a second position, and a third position;

a lever member coupled to the mobile member through a first attachment member and through a second attachment member, the first attachment member passing through the first opening, the second attachment member passing through the second opening; and wherein the first track and the second track are shaped so that while the second attachment member is moving from the first position to the second position of the second track, the first attachment member is held in the first position of the first track by the first track and the lever member.

5. The hinge of claim 4 wherein the first track and the second track are shaped so that while the first attachment member is at the first position of the first track, the second attachment member can move from the first position to the second position of the second track thereby traveling substantially in an arc about the first attachment member.

6. The hinge of claim 5 wherein the first track and the second track are shaped so that while the first attachment member is moving from the second position to the third position of the first track, the second attachment member is held in the third position of the second track by the second track and the lever member.

7. The hinge of claim 6 wherein the first track and the second track are shaped so that while the second attachment member is at the third position of the second track, the first attachment member can move from the second position to the third position of the first track thereby traveling substantially in an arc about the second attachment member.

8. The hinge of claim 4 wherein the first track having a first portion with a first width and a second portion with a second width, the first width being greater than the second width; and wherein the lever member having a peg portion extending from another portion of the level member, the peg portion having a width greater than the second width of the first track and smaller than the first width of the first track, the lever being positioned so that the peg portion of the lever member is inserted into the first portion of the first track when the first attachment member is at a first position of the first track and the peg portion is adjacent to, but not in, the second portion of the first track when the first attachment member is at a second position of the first track.

* * * * *